US011063856B2

(12) United States Patent
Ranjit et al.

(10) Patent No.: US 11,063,856 B2
(45) Date of Patent: Jul. 13, 2021

(54) VIRTUAL NETWORK FUNCTION MONITORING IN A NETWORK FUNCTION VIRTUALIZATION DEPLOYMENT

(71) Applicant: Cisco Technology, Inc., San Jose, CA (US)

(72) Inventors: Dinesh Ranjit, San Jose, CA (US); Jim French, Raleigh, NC (US); Nagi Swaminathan, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 201 days.

(21) Appl. No.: 15/685,237

(22) Filed: Aug. 24, 2017

(65) Prior Publication Data
US 2019/0068476 A1   Feb. 28, 2019

(51) Int. Cl.
*H04L 12/26* (2006.01)
*G06F 9/455* (2018.01)
(Continued)

(52) U.S. Cl.
CPC ............ *H04L 43/10* (2013.01); *H04L 41/084* (2013.01); *H04L 43/06* (2013.01); *H04L 43/08* (2013.01);
(Continued)

(58) Field of Classification Search
CPC ..... H04L 43/10; H04L 43/12; H04L 43/0817; H04L 41/084; H04L 43/06; H04L 43/08;
(Continued)

(56) References Cited

U.S. PATENT DOCUMENTS 3,629,512 A   12/1971  Yuan
4,769,811 A    9/1988  Eckberg, Jr. et al.
(Continued)

FOREIGN PATENT DOCUMENTS

CN   103716123   4/2014
CN   103716137   4/2014
(Continued)

OTHER PUBLICATIONS

Aldrin, S., et al. "Service Function Chaining Operation, Administration and Maintenance Framework," Internet Engineering Task Force, Oct. 26, 2014, 13 pages.
(Continued)

*Primary Examiner* — Benjamin R Bruckart
*Assistant Examiner* — Tien M Nguyen
(74) *Attorney, Agent, or Firm* — Polsinelli PC (57) ABSTRACT

The subject disclosure relates to methods for monitoring virtual network functions (VNFs) using mirror-ports provided on a virtual switch. A method of the technology can include steps for detecting an instantiation of a virtual network function (VNF), receiving a plurality of operating parameters for the VNF, connecting the VNF with a virtual switch, and automatically discovering an Internet Protocol (IP) address of the VNF. In some aspects, the method can further include operations for instantiating a mirror-port on the virtual switch, the mirror-port configured to provide a communications interface for monitoring the VNF based on a monitoring parameter. Systems and computer-readable media are also provided.

15 Claims, 4 Drawing Sheets

(51) Int. Cl.
*H04L 12/24* (2006.01)
*H04L 29/12* (2006.01)

(52) U.S. Cl.
CPC .......... *H04L 43/0817* (2013.01); *H04L 43/12* (2013.01); *G06F 2009/45591* (2013.01); *H04L 41/082* (2013.01); *H04L 43/04* (2013.01); *H04L 61/103* (2013.01); *H04L 61/6022* (2013.01)

(58) Field of Classification Search
CPC ... H04L 61/103; H04L 61/6022; H04L 43/04; H04L 41/082
See application file for complete search history.

(56) References Cited

U.S. PATENT DOCUMENTS

| | | |
|---|---|---|
| 5,408,231 A | 4/1995 | Bowdon |
| 5,491,690 A | 2/1996 | Alfonsi et al. |
| 5,557,609 A | 9/1996 | Shobatake et al. |
| 5,600,638 A | 2/1997 | Bertin et al. |
| 5,687,167 A | 11/1997 | Bertin et al. |
| 6,115,384 A | 9/2000 | Parzych |
| 6,167,438 A | 12/2000 | Yates et al. |
| 6,400,681 B1 | 6/2002 | Bertin et al. |
| 6,661,797 B1 | 12/2003 | Goel et al. |
| 6,687,229 B1 | 2/2004 | Kataria et al. |
| 6,799,270 B1 | 9/2004 | Bull et al. |
| 6,888,828 B1 | 5/2005 | Partanen et al. |
| 6,993,593 B2 | 1/2006 | Iwata |
| 7,027,408 B2 | 4/2006 | Nabkel et al. |
| 7,062,567 B2 | 6/2006 | Benitez et al. |
| 7,095,715 B2 | 8/2006 | Buckman et al. |
| 7,096,212 B2 | 8/2006 | Tribble et al. |
| 7,139,239 B2 | 11/2006 | Mcfarland et al. |
| 7,165,107 B2 | 1/2007 | Pouyoul et al. |
| 7,197,008 B1 | 3/2007 | Shabtay et al. |
| 7,197,660 B1 | 3/2007 | Liu et al. |
| 7,209,435 B1 | 4/2007 | Kuo et al. |
| 7,227,872 B1 | 6/2007 | Biswas et al. |
| 7,231,462 B2 | 6/2007 | Berthaud et al. |
| 7,333,990 B1 | 2/2008 | Thiagarajan et al. |
| 7,443,796 B1 | 10/2008 | Albert et al. |
| 7,458,084 B2 | 11/2008 | Zhang et al. |
| 7,472,411 B2 | 12/2008 | Wing et al. |
| 7,486,622 B2 | 2/2009 | Regan et al. |
| 7,536,396 B2 | 5/2009 | Johnson et al. |
| 7,552,201 B2 | 6/2009 | Areddu et al. |
| 7,558,261 B2 | 7/2009 | Arregoces et al. |
| 7,567,504 B2 | 7/2009 | Darling et al. |
| 7,571,470 B2 | 8/2009 | Arregoces et al. |
| 7,573,879 B2 | 8/2009 | Narad et al. |
| 7,610,375 B2 | 10/2009 | Portolani et al. |
| 7,643,468 B1 | 1/2010 | Arregoces et al. |
| 7,644,182 B2 | 1/2010 | Banerjee et al. |
| 7,647,422 B2 | 1/2010 | Singh et al. |
| 7,657,898 B2 | 2/2010 | Sadiq |
| 7,657,940 B2 | 2/2010 | Portolani et al. |
| 7,668,116 B2 | 2/2010 | Wijnands et al. |
| 7,684,321 B2 | 3/2010 | Muirhead et al. |
| 7,738,469 B1 | 6/2010 | Shekokar et al. |
| 7,751,409 B1 | 7/2010 | Carolan |
| 7,793,157 B2 | 9/2010 | Bailey et al. |
| 7,814,284 B1 | 10/2010 | Glass et al. |
| 7,831,693 B2 | 11/2010 | Lai |
| 7,852,785 B2 | 12/2010 | Lund et al. |
| 7,860,095 B2 | 12/2010 | Forissier et al. |
| 7,860,100 B2 | 12/2010 | Khalid et al. |
| 7,895,425 B2 | 2/2011 | Khalid et al. |
| 7,899,012 B2 | 3/2011 | Ho et al. |
| 7,899,861 B2 | 3/2011 | Feblowitz et al. |
| 7,907,595 B2 | 3/2011 | Khanna et al. |
| 7,908,480 B2 | 3/2011 | Firestone et al. |
| 7,983,174 B1 | 7/2011 | Monaghan et al. |
| 7,990,847 B1 | 8/2011 | Leroy et al. |
| 8,000,329 B2 | 8/2011 | Fendick et al. |
| 8,018,938 B2 | 9/2011 | Fromm et al. |
| 8,094,575 B1 | 1/2012 | Vadlakonda et al. |
| 8,095,683 B2 | 1/2012 | Balasubramaniam |
| 8,116,307 B1 | 2/2012 | Thesayi et al. |
| 8,166,465 B2 | 4/2012 | Feblowitz et al. |
| 8,180,909 B2 | 5/2012 | Hartman et al. |
| 8,191,119 B2 | 5/2012 | Wing et al. |
| 8,195,774 B2 | 6/2012 | Lambeth et al. |
| 8,280,354 B2 | 10/2012 | Smith et al. |
| 8,281,302 B2 | 10/2012 | Durazzo et al. |
| 8,291,108 B2 | 10/2012 | Raja et al. |
| 8,305,900 B2 | 11/2012 | Bianconi |
| 8,311,045 B2 | 11/2012 | Quinn et al. |
| 8,316,457 B1 | 11/2012 | Paczkowski et al. |
| 8,355,332 B2 | 1/2013 | Beaudette et al. |
| 8,442,043 B2 | 5/2013 | Sharma et al. |
| 8,451,817 B2 | 5/2013 | Cheriton |
| 8,464,336 B2 | 6/2013 | Wei et al. |
| 8,473,981 B1 | 6/2013 | Gargi |
| 8,479,298 B2 | 7/2013 | Keith et al. |
| 8,498,414 B2 | 7/2013 | Rossi |
| 8,520,672 B2 | 8/2013 | Guichard et al. |
| 8,601,152 B1 | 12/2013 | Chou |
| 8,605,588 B2 | 12/2013 | Sankaran et al. |
| 8,612,612 B1 | 12/2013 | Dukes et al. |
| 8,627,328 B2 | 1/2014 | Mousseau et al. |
| 8,645,952 B2 | 2/2014 | Biswas et al. |
| 8,676,965 B2 | 3/2014 | Gueta |
| 8,676,980 B2 | 3/2014 | Kreeger et al. |
| 8,700,892 B2 | 4/2014 | Bollay et al. |
| 8,724,466 B2 | 5/2014 | Kenigsberg et al. |
| 8,730,980 B2 | 5/2014 | Bagepalli et al. |
| 8,743,885 B2 | 6/2014 | Khan et al. |
| 8,751,420 B2 | 6/2014 | Hjelm et al. |
| 8,762,534 B1 | 6/2014 | Hong et al. |
| 8,762,707 B2 | 6/2014 | Killian et al. |
| 8,792,490 B2 | 7/2014 | Jabr et al. |
| 8,793,400 B2 | 7/2014 | Mcdysan et al. |
| 8,812,730 B2 | 8/2014 | Vos et al. |
| 8,819,419 B2 | 8/2014 | Carlson et al. |
| 8,825,070 B2 | 9/2014 | Akhtar et al. |
| 8,830,834 B2 | 9/2014 | Sharma et al. |
| 8,904,037 B2 | 12/2014 | Haggar et al. |
| 8,984,284 B2 | 3/2015 | Purdy, Sr. et al. |
| 9,001,827 B2 | 4/2015 | Appenzeller |
| 9,071,533 B2 | 6/2015 | Hui et al. |
| 9,077,661 B2 | 7/2015 | Andreasen et al. |
| 9,088,584 B2 | 7/2015 | Feng et al. |
| 9,130,872 B2 | 9/2015 | Kumar et al. |
| 9,143,438 B2 | 9/2015 | Khan et al. |
| 9,160,797 B2 | 10/2015 | Mcdysan |
| 9,178,812 B2 | 11/2015 | Guichard et al. |
| 9,189,285 B2 | 11/2015 | Ng et al. |
| 9,203,711 B2 | 12/2015 | Agarwal et al. |
| 9,253,274 B2 | 2/2016 | Quinn et al. |
| 9,300,579 B2 | 3/2016 | Frost et al. |
| 9,300,585 B2 | 3/2016 | Kumar et al. |
| 9,311,130 B2 | 4/2016 | Christenson et al. |
| 9,319,324 B2 | 4/2016 | Beheshti-Zavareh et al. |
| 9,325,565 B2 | 4/2016 | Yao et al. |
| 9,338,097 B2 | 5/2016 | Anand et al. |
| 9,344,337 B2 | 5/2016 | Kumar et al. |
| 9,374,297 B2 | 6/2016 | Bosch et al. |
| 9,379,931 B2 | 6/2016 | Bosch et al. |
| 9,385,950 B2 | 7/2016 | Quinn et al. |
| 9,398,486 B2 | 7/2016 | La Roche, Jr. et al. |
| 9,407,540 B2 | 8/2016 | Kumar et al. |
| 9,413,655 B2 | 8/2016 | Shatzkamer et al. |
| 9,424,065 B2 | 8/2016 | Singh et al. |
| 9,436,443 B2 | 9/2016 | Chiosi et al. |
| 9,444,675 B2 | 9/2016 | Guichard et al. |
| 9,473,570 B2 | 10/2016 | Bhanujan et al. |
| 9,479,443 B2 | 10/2016 | Bosch et al. |
| 9,491,094 B2 | 11/2016 | Patwardhan et al. |
| 9,537,836 B2 | 1/2017 | Maller et al. |
| 9,558,029 B2 | 1/2017 | Behera et al. |
| 9,559,970 B2 | 1/2017 | Kumar et al. |
| 9,571,405 B2 | 2/2017 | Pignataro et al. |

(56) References Cited

U.S. PATENT DOCUMENTS

| | | | |
|---|---|---|---|
| 9,608,896 B2 | 3/2017 | Kumar et al. |
| 9,614,739 B2 | 4/2017 | Kumar et al. |
| 9,660,909 B2 | 5/2017 | Guichard et al. |
| 9,723,106 B2 | 8/2017 | Shen et al. |
| 9,774,533 B2 | 9/2017 | Zhang et al. |
| 9,794,379 B2 | 10/2017 | Kumar et al. |
| 9,882,776 B2 | 1/2018 | Aybay et al. |
| 9,929,945 B2 | 3/2018 | Schultz et al. |
| 10,003,530 B2 | 6/2018 | Zhang et al. |
| 10,367,705 B1* | 7/2019 | Rodriguez | H04L 41/0806 |
| 2001/0023442 A1 | 9/2001 | Masters |
| 2002/0085562 A1 | 7/2002 | Hufferd et al. |
| 2002/0131362 A1 | 9/2002 | Callon |
| 2002/0156893 A1 | 10/2002 | Pouyoul et al. |
| 2002/0167935 A1 | 11/2002 | Nabkel et al. |
| 2003/0023879 A1 | 1/2003 | Wray |
| 2003/0026257 A1 | 2/2003 | Xu et al. |
| 2003/0037070 A1 | 2/2003 | Marston |
| 2003/0055946 A1* | 3/2003 | Amemiya | H04L 29/06 |
| | | | 709/224 |
| 2003/0088698 A1 | 5/2003 | Singh et al. |
| 2003/0110081 A1 | 6/2003 | Tosaki et al. |
| 2003/0120816 A1 | 6/2003 | Berthaud et al. |
| 2003/0214913 A1 | 11/2003 | Kan et al. |
| 2003/0226142 A1 | 12/2003 | Rand |
| 2004/0109412 A1 | 6/2004 | Hansson et al. |
| 2004/0148391 A1 | 7/2004 | Lake, Sr. et al. |
| 2004/0193918 A1* | 9/2004 | Green | H04L 63/1433 |
| | | | 726/22 |
| 2004/0199812 A1 | 10/2004 | Earl |
| 2004/0213160 A1 | 10/2004 | Regan et al. |
| 2004/0264481 A1 | 12/2004 | Darling et al. |
| 2004/0268357 A1 | 12/2004 | Joy et al. |
| 2005/0044197 A1 | 2/2005 | Lai |
| 2005/0058118 A1 | 3/2005 | Davis |
| 2005/0060572 A1 | 3/2005 | Kung |
| 2005/0086367 A1 | 4/2005 | Conta et al. |
| 2005/0120101 A1 | 6/2005 | Nocera |
| 2005/0152378 A1 | 7/2005 | Bango et al. |
| 2005/0157645 A1 | 7/2005 | Rabie et al. |
| 2005/0160180 A1 | 7/2005 | Rabje et al. |
| 2005/0204042 A1 | 9/2005 | Banerjee et al. |
| 2005/0210096 A1 | 9/2005 | Bishop et al. |
| 2005/0257002 A1 | 11/2005 | Nguyen |
| 2005/0281257 A1 | 12/2005 | Yazaki et al. |
| 2005/0286540 A1 | 12/2005 | Hurtta et al. |
| 2005/0289244 A1 | 12/2005 | Sahu et al. |
| 2006/0005240 A1 | 1/2006 | Sundarrajan et al. |
| 2006/0031374 A1 | 2/2006 | Lu et al. |
| 2006/0045024 A1 | 3/2006 | Previdi et al. |
| 2006/0074502 A1 | 4/2006 | Mcfarland |
| 2006/0092950 A1 | 5/2006 | Arregoces et al. |
| 2006/0095960 A1 | 5/2006 | Arregoces et al. |
| 2006/0112400 A1 | 5/2006 | Zhang et al. |
| 2006/0155862 A1 | 7/2006 | Kathi et al. |
| 2006/0168223 A1 | 7/2006 | Mishra et al. |
| 2006/0233106 A1 | 10/2006 | Achlioptas et al. |
| 2006/0233155 A1 | 10/2006 | Srivastava |
| 2007/0061441 A1 | 3/2007 | Landis et al. |
| 2007/0067435 A1 | 3/2007 | Landis et al. |
| 2007/0094397 A1 | 4/2007 | Krelbaum et al. |
| 2007/0143851 A1 | 6/2007 | Nicodemus et al. |
| 2007/0237147 A1 | 10/2007 | Quinn et al. |
| 2007/0250836 A1 | 10/2007 | Li et al. |
| 2008/0056153 A1 | 3/2008 | Liu |
| 2008/0080509 A1 | 4/2008 | Khanna et al. |
| 2008/0080517 A1 | 4/2008 | Roy et al. |
| 2008/0170542 A1 | 7/2008 | Hu |
| 2008/0177896 A1 | 7/2008 | Quinn et al. |
| 2008/0181118 A1 | 7/2008 | Sharma et al. |
| 2008/0196083 A1 | 8/2008 | Parks et al. |
| 2008/0209039 A1 | 8/2008 | Tracey et al. |
| 2008/0219287 A1 | 9/2008 | Krueger et al. |
| 2008/0225710 A1 | 9/2008 | Raja et al. |
| 2008/0291910 A1 | 11/2008 | Tadimeti et al. |
| 2009/0003364 A1 | 1/2009 | Fendick et al. |
| 2009/0006152 A1 | 1/2009 | Timmerman et al. |
| 2009/0037713 A1 | 2/2009 | Khalid et al. |
| 2009/0094684 A1 | 4/2009 | Chinnusamy et al. |
| 2009/0204612 A1 | 8/2009 | Keshavarz-nia et al. |
| 2009/0271656 A1 | 10/2009 | Yokota et al. |
| 2009/0300207 A1 | 12/2009 | Giaretta et al. |
| 2009/0305699 A1 | 12/2009 | Deshpande et al. |
| 2009/0328054 A1 | 12/2009 | Paramasivam et al. |
| 2010/0058329 A1 | 3/2010 | Durazzo et al. |
| 2010/0063988 A1 | 3/2010 | Khalid |
| 2010/0080226 A1 | 4/2010 | Khalid |
| 2010/0165985 A1 | 7/2010 | Sharma et al. |
| 2010/0191612 A1 | 7/2010 | Raleigh |
| 2010/0211658 A1 | 8/2010 | Hoogerwerf et al. |
| 2011/0023090 A1 | 1/2011 | Asati et al. |
| 2011/0032833 A1 | 2/2011 | Zhang et al. |
| 2011/0055845 A1 | 3/2011 | Nandagopal et al. |
| 2011/0103259 A1* | 5/2011 | Aybay | H04L 49/35 |
| | | | 370/254 |
| 2011/0131338 A1 | 6/2011 | Hu |
| 2011/0137991 A1 | 6/2011 | Russell |
| 2011/0142056 A1 | 6/2011 | Manoj |
| 2011/0161494 A1 | 6/2011 | Mcdysan et al. |
| 2011/0222412 A1 | 9/2011 | Kompella |
| 2011/0255538 A1 | 10/2011 | Srinivasan et al. |
| 2011/0267947 A1 | 11/2011 | Dhar et al. |
| 2012/0131662 A1 | 5/2012 | Kuik et al. |
| 2012/0147894 A1 | 6/2012 | Mulligan et al. |
| 2012/0324442 A1 | 12/2012 | Barde |
| 2012/0331135 A1 | 12/2012 | Alon et al. |
| 2013/0003735 A1 | 1/2013 | Chao et al. |
| 2013/0003736 A1 | 1/2013 | Szyszko et al. |
| 2013/0040640 A1 | 2/2013 | Chen et al. |
| 2013/0044636 A1 | 2/2013 | Koponen et al. |
| 2013/0121137 A1 | 5/2013 | Feng et al. |
| 2013/0124708 A1 | 5/2013 | Lee et al. |
| 2013/0163594 A1 | 6/2013 | Sharma et al. |
| 2013/0163606 A1 | 6/2013 | Bagepalli et al. |
| 2013/0238806 A1 | 9/2013 | Moen |
| 2013/0272305 A1 | 10/2013 | Lefebvre et al. |
| 2013/0311675 A1 | 11/2013 | Kancherla |
| 2013/0329584 A1 | 12/2013 | Ghose et al. |
| 2014/0010083 A1 | 1/2014 | Hamdi et al. |
| 2014/0010096 A1 | 1/2014 | Kamble et al. |
| 2014/0036730 A1 | 2/2014 | Nellikar et al. |
| 2014/0050223 A1 | 2/2014 | Foo et al. |
| 2014/0064104 A1* | 3/2014 | Nataraja | H04L 61/103 |
| | | | 370/248 |
| 2014/0067758 A1 | 3/2014 | Boldyrev et al. |
| 2014/0105062 A1 | 4/2014 | McDysan et al. |
| 2014/0181267 A1 | 6/2014 | Wadkins et al. |
| 2014/0254603 A1 | 9/2014 | Banavalikar et al. |
| 2014/0259012 A1 | 9/2014 | Nandlall et al. |
| 2014/0279863 A1 | 9/2014 | Krishnamurthy et al. |
| 2014/0280836 A1 | 9/2014 | Kumar et al. |
| 2014/0317261 A1 | 10/2014 | Shatzkamer et al. |
| 2014/0321459 A1 | 10/2014 | Kumar et al. |
| 2014/0334295 A1 | 11/2014 | Guichard et al. |
| 2014/0344439 A1 | 11/2014 | Kempf et al. |
| 2014/0359365 A1* | 12/2014 | Kottler | G06F 11/079 |
| | | | 714/37 |
| 2014/0362682 A1 | 12/2014 | Guichard et al. |
| 2014/0362857 A1 | 12/2014 | Guichard et al. |
| 2014/0369209 A1 | 12/2014 | Khurshid et al. |
| 2014/0376558 A1 | 12/2014 | Rao et al. |
| 2015/0003455 A1 | 1/2015 | Haddad et al. |
| 2015/0012584 A1 | 1/2015 | Lo et al. |
| 2015/0012988 A1 | 1/2015 | Jeng et al. |
| 2015/0029871 A1 | 1/2015 | Frost et al. |
| 2015/0032871 A1 | 1/2015 | Allan et al. |
| 2015/0052516 A1 | 2/2015 | French et al. |
| 2015/0071285 A1 | 3/2015 | Kumar et al. |
| 2015/0074276 A1 | 3/2015 | DeCusatis et al. |
| 2015/0082308 A1 | 3/2015 | Kiess et al. |
| 2015/0085635 A1 | 3/2015 | Wijnands et al. |
| 2015/0085870 A1 | 3/2015 | Narasimha et al. |
| 2015/0089082 A1 | 3/2015 | Patwardhan et al. |
| 2015/0092564 A1 | 4/2015 | Aldrin |

(56) References Cited

U.S. PATENT DOCUMENTS

| | | |
|---|---|---|
| 2015/0103827 A1 | 4/2015 | Quinn et al. |
| 2015/0117308 A1 | 4/2015 | Kant |
| 2015/0124622 A1 | 5/2015 | Kovvali et al. |
| 2015/0131484 A1 | 5/2015 | Aldrin |
| 2015/0131660 A1 | 5/2015 | Shepherd et al. |
| 2015/0156035 A1 | 6/2015 | Foo et al. |
| 2015/0180725 A1 | 6/2015 | Varney et al. |
| 2015/0180767 A1 | 6/2015 | Tam et al. |
| 2015/0181309 A1 | 6/2015 | Shepherd et al. |
| 2015/0188949 A1 | 7/2015 | Mahaffey et al. |
| 2015/0195197 A1 | 7/2015 | Yong et al. |
| 2015/0222516 A1 | 8/2015 | Deval et al. |
| 2015/0222533 A1 | 8/2015 | Birrittella et al. |
| 2015/0236948 A1 | 8/2015 | Dunbar et al. |
| 2015/0319078 A1 | 11/2015 | Lee et al. |
| 2015/0319081 A1 | 11/2015 | Kasturi et al. |
| 2015/0326473 A1 | 11/2015 | Dunbar et al. |
| 2015/0333930 A1 | 11/2015 | Aysola et al. |
| 2015/0334027 A1 | 11/2015 | Bosch et al. |
| 2015/0341285 A1 | 11/2015 | Aysola et al. |
| 2015/0365495 A1 | 12/2015 | Fan et al. |
| 2015/0381465 A1 | 12/2015 | Narayanan et al. |
| 2015/0381557 A1 | 12/2015 | Fan et al. |
| 2016/0028604 A1 | 1/2016 | Chakrabarti et al. |
| 2016/0028640 A1 | 1/2016 | Zhang et al. |
| 2016/0043952 A1 | 2/2016 | Zhang et al. |
| 2016/0050117 A1 | 2/2016 | Voellmy et al. |
| 2016/0050132 A1 | 2/2016 | Zhang |
| 2016/0080263 A1 | 3/2016 | Park et al. |
| 2016/0080496 A1 | 3/2016 | Falanga et al. |
| 2016/0099853 A1 | 4/2016 | Nedeltchev et al. |
| 2016/0119159 A1 | 4/2016 | Zhao et al. |
| 2016/0119253 A1 | 4/2016 | Kang et al. |
| 2016/0127139 A1 | 5/2016 | Tian et al. |
| 2016/0134518 A1 | 5/2016 | Callon et al. |
| 2016/0134535 A1 | 5/2016 | Callon |
| 2016/0139939 A1 | 5/2016 | Bosch et al. |
| 2016/0164776 A1 | 6/2016 | Biancaniello |
| 2016/0165014 A1 | 6/2016 | Nainar et al. |
| 2016/0173373 A1 | 6/2016 | Guichard et al. |
| 2016/0173464 A1 | 6/2016 | Wang et al. |
| 2016/0182336 A1 | 6/2016 | Doctor et al. |
| 2016/0182342 A1 | 6/2016 | Singaravelu et al. |
| 2016/0182684 A1 | 6/2016 | Connor et al. |
| 2016/0212017 A1 | 7/2016 | Li et al. |
| 2016/0226742 A1 | 8/2016 | Apathotharanan et al. |
| 2016/0248685 A1 | 8/2016 | Pignataro et al. |
| 2016/0277250 A1 | 9/2016 | Maes |
| 2016/0285720 A1 | 9/2016 | Měnpëë et al. |
| 2016/0323165 A1 | 11/2016 | Boucadair et al. |
| 2016/0352629 A1 | 12/2016 | Wang et al. |
| 2016/0380966 A1 | 12/2016 | Gunnalan et al. |
| 2017/0019303 A1 | 1/2017 | Swamy et al. |
| 2017/0031804 A1 | 2/2017 | Ciszewski et al. |
| 2017/0078175 A1 | 3/2017 | Xu et al. |
| 2017/0187609 A1 | 6/2017 | Lee et al. |
| 2017/0208000 A1 | 7/2017 | Bosch et al. |
| 2017/0214627 A1 | 7/2017 | Zhang et al. |
| 2017/0237656 A1 | 8/2017 | Gage et al. |
| 2017/0250917 A1 | 8/2017 | Ruckstuhl et al. |
| 2017/0272470 A1 | 9/2017 | Gundamaraju et al. |
| 2017/0279712 A1 | 9/2017 | Nainar et al. |
| 2017/0310611 A1 | 10/2017 | Kumar et al. |
| 2017/0331741 A1 | 11/2017 | Fedyk et al. |
| 2018/0013841 A1 | 1/2018 | Nainar et al. |
| 2018/0026884 A1 | 1/2018 | Nainar et al. |
| 2018/0026887 A1 | 1/2018 | Nainar et al. |
| 2018/0041470 A1 | 2/2018 | Schultz et al. |
| 2018/0062991 A1 | 3/2018 | Nainar et al. |
| 2018/0083850 A1* | 3/2018 | Rabipour .............. H04L 43/022 |
| 2018/0123928 A1* | 5/2018 | Moradi ................... G06F 11/30 |

FOREIGN PATENT DOCUMENTS

| | | |
|---|---|---|
| EP | 3160073 | 4/2017 |
| JP | 2016149686 | 8/2016 |
| WO | WO 2011/029321 | 3/2011 |
| WO | WO 2012/056404 | 5/2012 |
| WO | WO 2015/065353 | 5/2015 |
| WO | WO 2015/180559 | 12/2015 |
| WO | WO 2015/187337 | 12/2015 |
| WO | WO 2016/004556 | 1/2016 |
| WO | WO 2016/058245 | 4/2016 |
| WO | WO 2017/011607 | 1/2017 |

OTHER PUBLICATIONS

Alizadeh, Mohammad, et al., "CONGA: Distributed Congestion-Aware Load Balancing for Datacenters," SIGCOMM '14, Aug. 17-22, 2014, 12 pages.

Author Unknown, "ANSI/SCTE 35 2007 Digital Program Insertion Cueing Message for Cable," Engineering Committee, Digital Video Subcommittee, American National Standard, Society of Cable Telecommunications Engineers, ©Society of Cable Telecommunications Engineers, Inc. 2007 All Rights Reserved, 140 Philips Road, Exton, PA 19341; 42 pages.

Author Unknown, "AWS Lambda Developer Guide," Amazon Web Services Inc., May 2017, 416 pages.

Author Unknown, "CEA-708," from Wikipedia, the free encyclopedia, Nov. 15, 2012; 16 pages http://en.wikipedia.org/w/index.php?title=CEA-708&oldid=523143431.

Author Unknown, "Cisco and Intel High-Performance VNFs on Cisco NFV Infrastructure," White Paper, Cisco and Intel, Oct. 2016, 7 pages.

Author Unknown, "Cloud Functions Overview," Cloud Functions Documentation, Mar. 21, 2017, 3 pages; https://cloud.google.com/functions/docs/concepts/overview.

Author Unknown, "Cloud-Native VNF Modelling," Open Source Mano, ©ETSI 2016, 18 pages.

Author Unknown, "Digital Program Insertion," from Wikipedia, the free encyclopedia, Jan. 2, 2012; 1 page http://en.wikipedia.org/w/index.php?title=Digital_Program_Insertion&oldid=469076482.

Author Unknown, "Dynamic Adaptive Streaming over HTTP," from Wikipedia, the free encyclopedia, Oct. 25, 2012; 3 pages, http://en.wikipedia.org/w/index.php?title=Dynamic_Adaptive_Streaming_over_HTTP&oldid=519749189.

Author Unknown, "GStreamer and in-band metadata," from RidgeRun Developer Connection, Jun. 19, 2012, 5 pages https://developersidgerun.com/wiki/index.php/GStreamer_and_in-band_metadata.

Author Unknown, "IEEE Standard for the Functional Architecture of Next Generation Service Overlay Networks, IEEE Std. 1903-2011," IEEE, Piscataway, NJ, Oct. 7, 2011; 147 pages.

Author Unknown, "ISO/IEC JTC 1/SC 29, Information Technology—Dynamic Adaptive Streaming over HTTP (DASH)—Part 1: Media Presentation Description and Segment Formats," International Standard @ISO/IEC 2012—All Rights Reserved; Jan. 5, 2012; 131 pages.

Author Unknown, "M-PEG 2 Transmission," ©Dr. Gorry Fairhurst, 9 pages [Published on or about Jan. 12, 2012] http://www.erg.abdn.ac.uk/future-net/digital-video/mpeg2-trans.html.

Author Unknown, "MPEG Transport Stream," from Wikipedia, the free encyclopedia, Nov. 11, 2012; 7 pages, http://en.wikipedia.org/w/index.php?title=MPEG_transport_stream&oldid=522468296.

Author Unknown, "Network Functions Virtualisation (NFV); Use Cases," ETSI, GS NFV 001 v1.1.1, Architectural Framework, © European Telecommunications Standards Institute, Oct. 2013, 50 pages.

Author Unknown, "OpenNebula 4.6 User Guide," Jun. 12, 2014, opennebula.org, 87 pages.

Author Unknown, "Understanding Azure, A Guide for Developers," Microsoft Corporation, Copyright @ 2016 Microsoft Corporation, 39 pages.

Author Unknown, "3GPP TR 23.803 V7.0.0 (Sep. 2005) Technical Specification: Group Services and System Aspects; Evolution of Policy Control and Charging (Release 7)," 3rd Generation Partner- (56) References Cited

OTHER PUBLICATIONS ship Project (3GPP), 650 Route des Lucioles—Sophia Antipolis Val bonne—France, Sep. 2005; 30 pages.
Author Unknown, "3GPP TS 23.203 V8.9.0 (Mar. 2010) Technical Specification: Group Services and System Aspects; Policy and Charging Control Architecture (Release 8)," 3rd Generation Partnership Project (3GPP), 650 Route des Lucioles—Sophia Antipolis Val bonne—France, Mar. 2010; 116 pages.
Author Unknown, "3GPP TS 23.401 V13.5.0 (Dec. 2015) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 13)," 3GPP, 650 Route des Lucioles—Sophia Antipolis Valbonne—France, Dec. 2015, 337 pages.
Author Unknown, "3GPP TS 23.401 V9.5.0 (Jun. 2010) Technical Specification: Group Services and Systems Aspects; General Packet Radio Service (GPRS) Enhancements for Evolved Universal Terrestrial Radio Access Network (E-UTRAN) Access (Release 9)," 3rd Generation Partnership Project (3GPP), 650 Route des Lucioles—Sophia Antipolis Valbonne—France, Jun. 2010; 259 pages.
Author Unknown, "3GPP TS 29.212 V13.1.0 (Mar. 2015) Technical Specification: 3rd Generation Partnership Project; Technical Specification Group Core Network and Terminals; Policy and Charging Control (PCC); Reference points (Release 13)," 3rd Generation Partnership Project (3GPP), 650 Route des Lucioles—Sophia Antipolis Valbonne—France, Mar. 2015; 230 pages.
Author Unknown, "Service-Aware Network Architecture Based on SDN, NFV, and Network Intelligence," 2014, 8 pages.
Baird, Andrew, et al. "AWS Serverless Multi-Tier Architectures; Using Amazon API Gateway and AWS Lambda," Amazon Web Services Inc., Nov. 2015, 20 pages.
Bi, Jing, et al., "Dynamic Provisioning Modeling for Virtualized Multi-tier Applications in Cloud Data Center," 2010 IEEE $3^{rd}$ International Conference on Cloud Computing, Jul. 5, 2010, pp. 370-377, IEEE Computer Society.
Bitar, N., et al., "Interface to the Routing System (I2RS) for the Service Chaining: Use Cases and Requirements," draft-bitar-i2rs-service-chaining-01, Feb. 14, 2014, pp. 1-15.
Boucadair, Mohamed, et al., "Differentiated Service Function Chaining Framework," Network Working Group Internet Draft draft-boucadair-network-function-chaining-03, Aug. 21, 2013, 21 pages.
Bremler-Barr, Anat, et al., "Deep Packet Inspection as a Service," CoNEXT '14, Dec. 2-5, 2014, pp. 271-282.
Cisco Systems, Inc. "Cisco NSH Service Chaining Configuration Guide," Jul. 28, 2017, 11 pages.
Cisco Systems, Inc. "Cisco VN-LINK: Virtualization-Aware Networking," 2009, 9 pages.
Dunbar, et al., "Architecture for Chaining Legacy Layer 4-7 Service Functions," IETF Network Working Group Internet Draft, draft-dunbar-sfc-legacy-14-17-chain-architecture-03.txt, Feb. 10, 2014; 17 pages.
Ersue, Mehmet, "ETSI NFV Management and Orchestration—An Overview," Presentation at the IETF# 88 Meeting, Nov. 3, 2013, 14 pages.
Farrel, A., et al., "A Path Computation Element (PCE)—Based Architecture," RFC 4655, Network Working Group, Aug. 2006, 40 pages.
Fayaz, Seyed K., et al., "Efficient Network Reachability Analysis using a Succinct Control Plane Representation," 2016, ratul.org, pp. 1-16.
Halpern, Joel, et al., "Service Function Chaining (SFC) Architecture," Internet Engineering Task Force (IETF), Cisco, Oct. 2015, 32 pages.

Hendrickson, Scott, et al. "Serverless Computation with OpenLambda," Elastic 60, University of Wisconson, Madison, Jun. 20, 2016, 7 pages, https://www.usenix.org/system/files/conference/hotcloud16/hotcloud16_hendrickson.pdf.
Jiang, Y., et al., "An Architecture of Service Function Chaining," IETF Network Working Group Internet Draft, draft-jiang-sfc-arch-01.txt, Feb. 14, 2014; 12 pages.
Jiang, Yuanlong, et al., "Fault Management in Service Function Chaining," Network Working Group, China Telecom, Oct. 16, 2015, 13 pages.
Katsikas, Goergios P., et al., "Profiling and accelerating commodity NFV service chains with SCC," The Journal of Systems and Software, vol. 127, Jan. 2017, pp. 12-27.
Kumar, Surendra, et al., "Service Function Path Optimization: draft-kumar-sfc-sfp-optimization-00.txt," Internet Engineering Task Force, IETF; Standard Working Draft, May 10, 2014, 14 pages.
Kumbhare, Abhijit, et al., "Opendaylight Service Function Chaining Use-Cases," Oct. 14, 2014, 25 pages.
Li, Hongyu, "Service Function Chaining Use Cases", IETF 88 Vancouver, Nov. 7, 2013, 7 pages.
Mortensen, A., et al., "Distributed Denial of Service (DDoS) Open Threat Signaling Requirements," DOTS, Mar. 18, 2016, 16 pages; https://tools.ietf.org/pdf/draft-ietf-dots-requirements-01.pdf.
Newman, David, "Review: FireEye fights off multi-stage malware," Network World, May 5, 2014, 7 pages.
Nguyen, Kim-Khoa, et al. "Distributed Control Plane Architecture of Next Generation IP Routers," IEEE, 2009, 8 pages.
Penno, Reinaldo, et al. "Packet Generation in Service Function Chains," draft-penno-sfc-packet-03, Apr. 29, 2016, 25 pages.
Penno, Reinaldo, et al. "Services Function Chaining Traceroute," draft-penno-sfc-trace-03, Sep. 30, 2015, 9 pages.
Pierre-Louis, Marc-Arhtur, "OpenWhisk: A quick tech preview," DeveloperWorks Open, IBM, Feb. 22, 2016, modified Mar. 3, 2016, 7 pages; https://developer.ibm.com/open/2016/02/22/openwhisk-a-quick-tech-preview/.
Pujol, Pua Capdevila, "Deployment of NFV and SFC scenarios," EETAC, Master Thesis, Advisor: David Rincon Rivera, Universitat Politecnica De Catalunya, Feb. 17, 2017, 115 pages.
Quinn, P., et al., "Network Service Header," Network Working Group, Mar. 24, 2015, 42 pages; https://tools.ietf.org/pdf/draft-ietf-sfc-nsh-00.pdf.
Quinn, P., et al., "Network Service Chaining Problem Statement," draft-quinn-nsc-problem-statement-03.txt, Aug. 26, 2013, 18 pages.
Quinn, Paul, et al., "Network Service Header," Network Working Group, draft-quinn-sfc-nsh-02.txt, Feb. 14, 2014, 21 pages.
Quinn, Paul, et al., "Network Service Header," Network Working Group, draft-quinn-nsh-00.txt, Jun. 13, 2013, 20 pages.
Quinn, Paul, et al., "Network Service Header," Network Working Group Internet Draft draft-quinn-nsh-01, Jul. 12, 2013, 20 pages.
Quinn, Paul, et al., "Service Function Chaining (SFC) Architecture," Network Working Group Internet Draft draft-quinn-sfc-arch-05.txt, May 5, 2014, 31 pages.
Quinn, Paul, et al., "Service Function Chaining: Creating a Service Plane via Network Service Headers," IEEE Computer Society, 2014, pp. 38-44.
Wong, Fei, et al., "SMPTE-TT Embedded in ID3 for HTTP Live Streaming, draft-smpte-id3-http-live-streaming-00," Informational Internet Draft, Jun. 2012, 7 pages http://tools.ietf.org/html/draft-smpte-id3-http-live-streaming-00.
Yadav, Rishi, "What Real Cloud-Native Apps Will Look Like," Crunch Network, posted Aug. 3, 2016, 8 pages; https://techcrunch.com/2016/08/03/what-real-cloud-native-apps-will-look-like/.
Zhang, Ying, et al. "StEERING: A Software-Defined Networking for Inline Service Chaining," IEEE, 2013, IEEE, p. 10 pages.

* cited by examiner

VIRTUAL NETWORK FUNCTION MONITORING IN A NETWORK FUNCTION VIRTUALIZATION DEPLOYMENT

BACKGROUND

1. Technical Field

The subject technology relates to the monitoring of virtual network functions (VNFs) and in particular, the use of mirror-ports on a virtual network switch for sending and receiving network traffic used to monitor various aspects of VNF operation.

2. Introduction

The utilization of network function virtualization (NFV) and software defined network (SDN) technologies allows the decoupling of network functions from underlying hardware so they can run as software images or logical modules on commercial off-the-shelf and purpose-built hardware. Network virtualization makes it possible to use off-the-rack technologies (e.g., computers and storage media) to virtualize network functions. One objective of NFV deployments is to reduce dependence on dedicated physical devices by allocating and using the physical and virtual resources only when needed.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

With the proliferation of network function virtualization (NFV) technologies, many network functionalities that were previously performed by hardware devices, such as switching and firewall functions, are now routinely implemented by virtual appliances, i.e., virtual network functions (VNFs). Many VNF systems are provided as closed systems, (e.g., by third parties) and have operating systems that cannot be easily modified or updated. Some VNF packages can incorporate specific routines and drivers, which when registered by an instantiating hypervisor, can facilitate certain network monitoring functionality. However, because of the closed nature of most VNF devices, network monitoring capabilities can be difficult to implement. For example, VNF monitoring on NFV platforms typically requires the VNFs to install some drivers/packages provided by the hypervisor (e.g., vmtools) to be able to detect liveness of the VNF As a result, there is a need to provide ways to implement network monitoring for closed-system VNFs.

Description

Aspects of the disclosed technology provide solutions for automatically discovering and monitoring newly instantiated VNFs. As discussed in further detail below, automatic Internet Protocol (IP) address discovery can be performed once a new VNF is spun-up and connected to a virtual routing device within a virtualization platform. VNF monitoring is then performed using mirror-ports on the virtual routing device that are configured for sending and receiving network traffic used to perform various discovery and functionality assessment operations.

Figure 1:
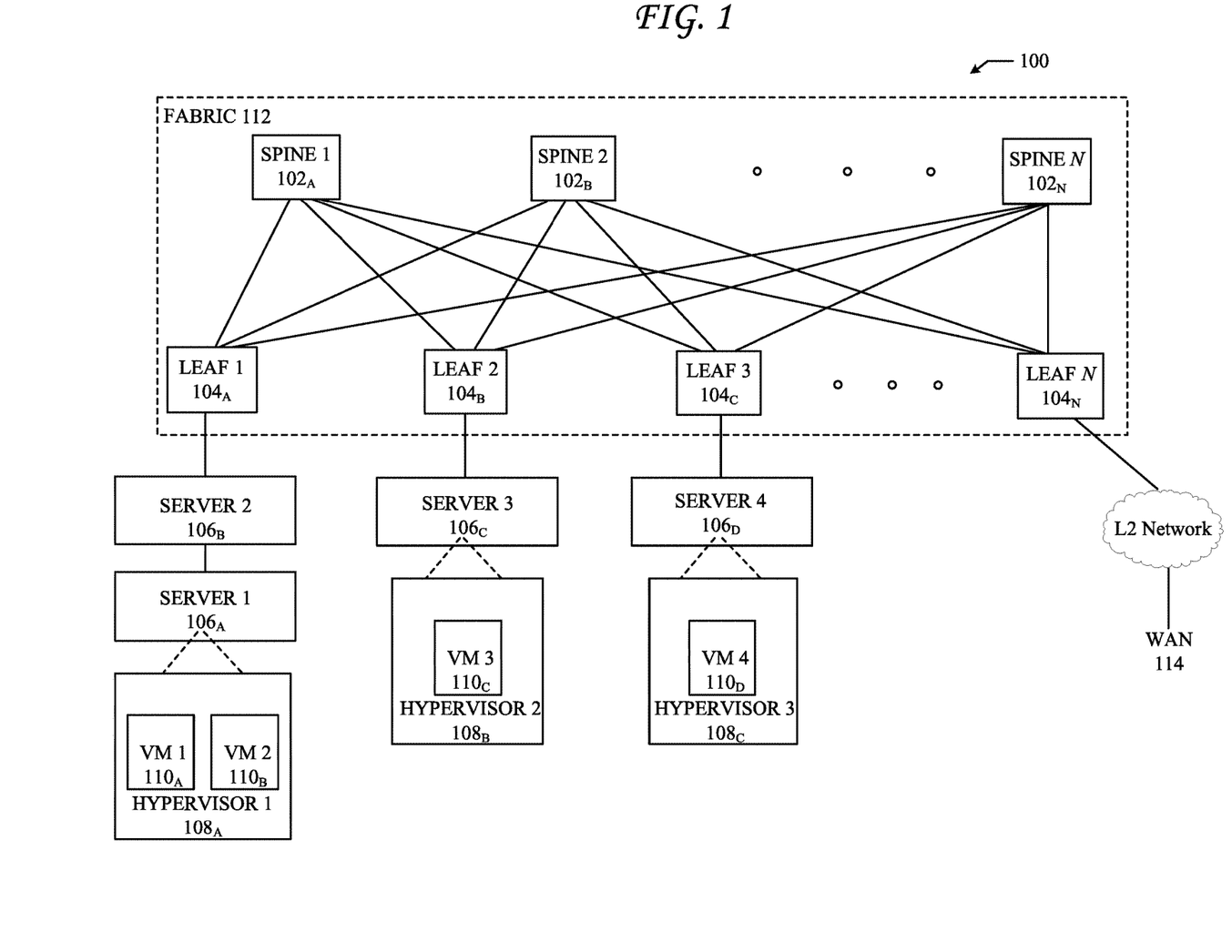
FIG. 1 illustrates an example network environment that can be used to implement some aspects of the subject technology.

FIG. 1 illustrates a diagram of an example network environment 100 in which a network function virtualization (NFV) platform can be implemented. Fabric 112 can represent the underlay (i.e., the physical network) of environment 100. Fabric 112 includes spine switches 1-N ($102_{A-N}$) (collectively "102") and leaf switches 1-N ($104_{A-N}$) (collectively "104"). Leaf switches 104 can reside at the edge of fabric 112, and can represent the physical network edges. Leaf switches 104 can be, for example, top-of-rack ("ToR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa.

Leaf switches 104 can include servers 1-4 (106A-D) (collectively "106"), hypervisors 1-4 (108A-108D) (collectively "108"), virtual machines (VMs) 1-4 (110A-110D) (collectively "110"). For example, leaf switches 104 can encapsulate and decapsulate packets to and from servers 106 in order to enable communications throughout environment 100. Leaf switches 104 can also connect other network-capable device(s) or network(s), such as a firewall, a database, a server, etc., to the fabric 112. Leaf switches 104 can also provide any other servers, resources, endpoints, external networks, VMs, services, tenants, or workloads with access to fabric 112.

Servers 106 can include hardware and software necessary to implement a network function virtualization (NFV) platform of the subject technology. As discussed further detail with respect to FIG. 2, servers 106 can be configured to implement an NFV platform, e.g., using hypervisors 108 to run and manage various VNF devices.

Figure 2:
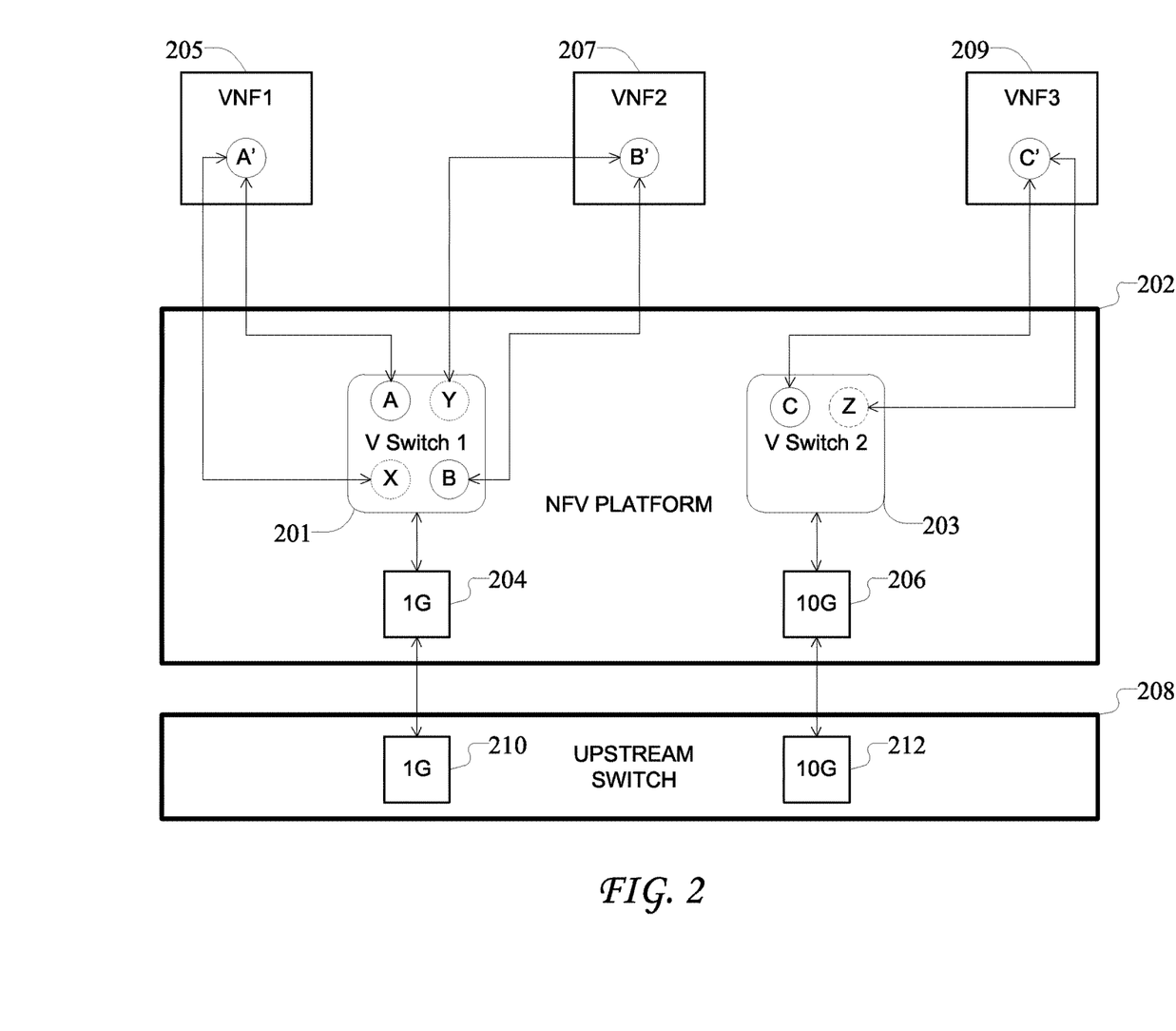
FIG. 2 illustrates an example of a network function virtualization platform on which mirror-ports may be implemented to provide virtual network function monitoring, according to some aspects of the technology.

Turning to FIG. 2, which illustrates an example network environment 200, including a network function virtualization (NFV) platform 202, configured for implementing a mirror-port monitoring technique of the subject technology. Environment 200 includes NFV platform 202, which includes two virtual switches (e.g., V Switch 1 201, and V Switch 2 203), as well as two physical ports, e.g., 1G port 204, and 10G port 206. It is understood that a NFV platform 202 can include additional (or fewer) devices, such as virtual switches or Ethernet bridges, as well as additional (or fewer) ports, without departing from the scope of the technology.

NFV platform 202 is coupled to upstream switch 208, via 1G port 204, and 10G port 206, which are coupled to 1G port 210, and 10G port 212 of upstream switch 208, respectively. As further illustrated, each virtual switch (e.g., V Switch 1, and V Switch 2), is coupled to a virtual network function (VNF), e.g., VNF1 205, VNF2 207, and/or VNF3 209. In the example of FIG. 2, V Switch 1 201 is coupled to VNF1 205 and VNF2 207, and V Switch 2 203 is coupled to VNF3 209; however it is understood that each virtual switch can be connected to a greater (or fewer) number of VNF devices, depending on implementation.

Communication between the virtual switches and VNFs is facilitated using corresponding ports on each device. In environment 200, communication between V Switch 1 201 and VNF1 205 is facilitated using ports A and A', disposed on V Switch 1 201 and VNF1 205, respectively. Communication between V Switch 1 201 and VNF2 207 is facilitated using ports B and B', on V Switch 1 201 and VNF2 207, respectively. Similarly, communication between V Switch 2 203 and VNF3 209 is accomplished using ports C and C', disposed on V Switch 2 203 and VNF3 209, respectively. It is understood, that a greater (or fewer) number of communication ports can be implemented on each virtual switch, without departing from the scope of the technology. Additionally, it is understood that V Switch 1 201 and V Switch 2 203 are intended to represent virtually any type of software switching device. By way of non-limiting example, the virtual switches can be implemented using an Open Virtual Switch (OVS) bridge, VM Ware Virtual Distributed Switch (VDS), or a Cisco Nexus 1000V Distributed Virtual Switch, or the like.

Virtual network functions (e.g., VNFs 1-3) represent virtual devices configured to perform a specific network function on received network traffic. By way of non-limiting example, VNFs may be configured to implement one or more operations including: switching, server load balancing (SLB), intrusion prevention systems (IPS), WAN optimization, firewall functions, deep packet inspection (DPI), or the like.

In the illustrated configuration, NFV platform 202 functions to provide a physical-to-virtual bridge for packet data provided by upstream switch 208. That is, packets received by NFV platform 202 from physical ports on upstream switch 208 (e.g., 1G port 210 and 10G port 202) are routed through V Switch 1 201 and/or V Switch 2 203, to one of VNFs 1-3. As would be understood by one of skill in the art, 1G port 204 and 10G port 206 can represent physical interfaces (e.g., line cards), configured to route traffic to one of virtual switches V Switch 1 201 or V Switch 2 203.

In operation, each VNF (e.g., VNF 1-3) is instantiated, for example, either through direct user interaction with NFV platform 202, or via a network controller (not illustrated). During the instantiation process, operating parameters can be provided for each VNF, for example, which define certain resources to be allotted to the VNF. By way of example, operating parameters can include information indicating a number of virtual CPUs, or an amount of memory resources to be allocated to the new VNF. In some aspects, operating parameters can include a monitoring parameter, for example, that indicates ways in which the VNF may be monitored, based on the VNF's functionality.

Monitoring parameters can include any information about a VNF that can be used to infer what types of monitoring can be used to verify a functional or operational status of the VNF. In some aspects, monitoring parameters can be provided by a user, (e.g., a network administrator that is instantiating the VNF). Alternatively, monitoring parameters may be inferred by VNF characteristics, such as a name, or third-party provider, etc. By way of non-limiting example, monitoring parameters can directly indicate packet types or programs that can be used to monitor a VNF, such as: an Address Resolution Protocol (ARP) for L2 VNFs (and higher), an Internet Control Message Protocol (ICMP) ping e.g., to determine a VNF's up/down state (for L3 VNFs and higher), or a wget request, e.g., to determine operational status of a VNF web server). In some instance custom scripts may be used, for example, to monitor custom VNFs (e.g., where the user can specify what the script executes).

Once a VNF has been instantiated, and operating parameters received, the VNF device is assigned a Media Access Layer (MAC) address, and connected to a virtual switch, e.g., either V Switch 1 201 or V Switch 2 203, within NFV Platform 202. Communication between a VNF and its associated virtual switch is facilitated through (virtual) ports located on each device.

Further to the example illustrated in FIG. 2, a connection between V Switch 1 201 and VNF1 205 is facilitated by virtual port A on V Switch 1 201, and virtual port A', on VNF1 205. A connection between V Switch 1 201 and VNF2 207 is facilitated by virtual port B, on V Switch 1 201, and virtual port B', on VNF2 207. Similarly, a connection between V Switch 2 203 and VNF3 209 is facilitated by virtual port C on V Switch 2 203, and virtual port C' on VNF3 209. Each port serves as an ingress/egress interface for communication between a virtual switch and an associated VNF.

Once a MAC address has been assigned to a newly instantiated VNF, an Internet Protocol (IP) address for the VNF is automatically detected by the NFV platform. For example, when VNF1 205 is newly instantiated and connected with V Switch 1 201 (e.g., via virtual ports A, and A'), then an IP address for VNF1 205 is automatically detected.

The means of IP address detection can vary with implementation. For example, IP addresses may be resolved through reference to an ARP table in the NFV platform, via a DHCP server (e.g., referenced using an assigned MAC address), or determined from a Bootstrap Protocol (BOOTP) server (e.g., referenced using an assigned MAC address), etc. By way of further example, IP address detection may be accomplished through reference to a Day0 configuration (e.g., that was implemented when the VNF was deployed), reference to an XML property that was passed to the VNF during deployment, and/or using an IP scanner utility, etc.

Using the detected IP address, it is possible to route packets to the VNF, for example, to perform operational and functional monitoring. In some aspects, monitoring traffic is sent to a selected VNF using a mirror-port configured on the virtual switch. By way of the foregoing example, once VNF1 205 is instantiated, mirror-port X can be created, which mirrors virtual port A on V Switch 1. Because mirror-port X is configured to be essentially identical to port A, mirror-port X can function as an interface with which monitoring events can be sourced. As illustrated in FIG. 2, multiple mirror-ports can exist on a single virtual switch; for example, mirror-port Y is a mirror of port B, which provides an interface and route to VNF2 207. Similarly, on V Switch 2, mirror-port Z provides a mirror to port C, which provides an interface and route to VNF3 209. That is, mirror-ports Y and Z can be used to provide packets necessary to perform monitoring of VNF2 207 and VNF3 209, respectively.

As understood by those of skill in the art, packet-based monitoring can include virtually any type of packet provided to a VNF to elicit information about the VNF's status, availability, and/or functionality. By way of non-limiting example, mirror-ports can be configured to perform monitoring of a given VNF using one or more of: an ICMP ping, a wget command, or a script selected for monitoring a particular VNF type (if known).

Through the use of mirror-ports, aspects of the technology provide an interface with which to source monitoring events. Additionally, by providing the mirror-port on the virtual switch to which the selected VNF is connected, automatic IP address discovery can be easily performed, and a direct route to the VNF provided.

Figure 3:
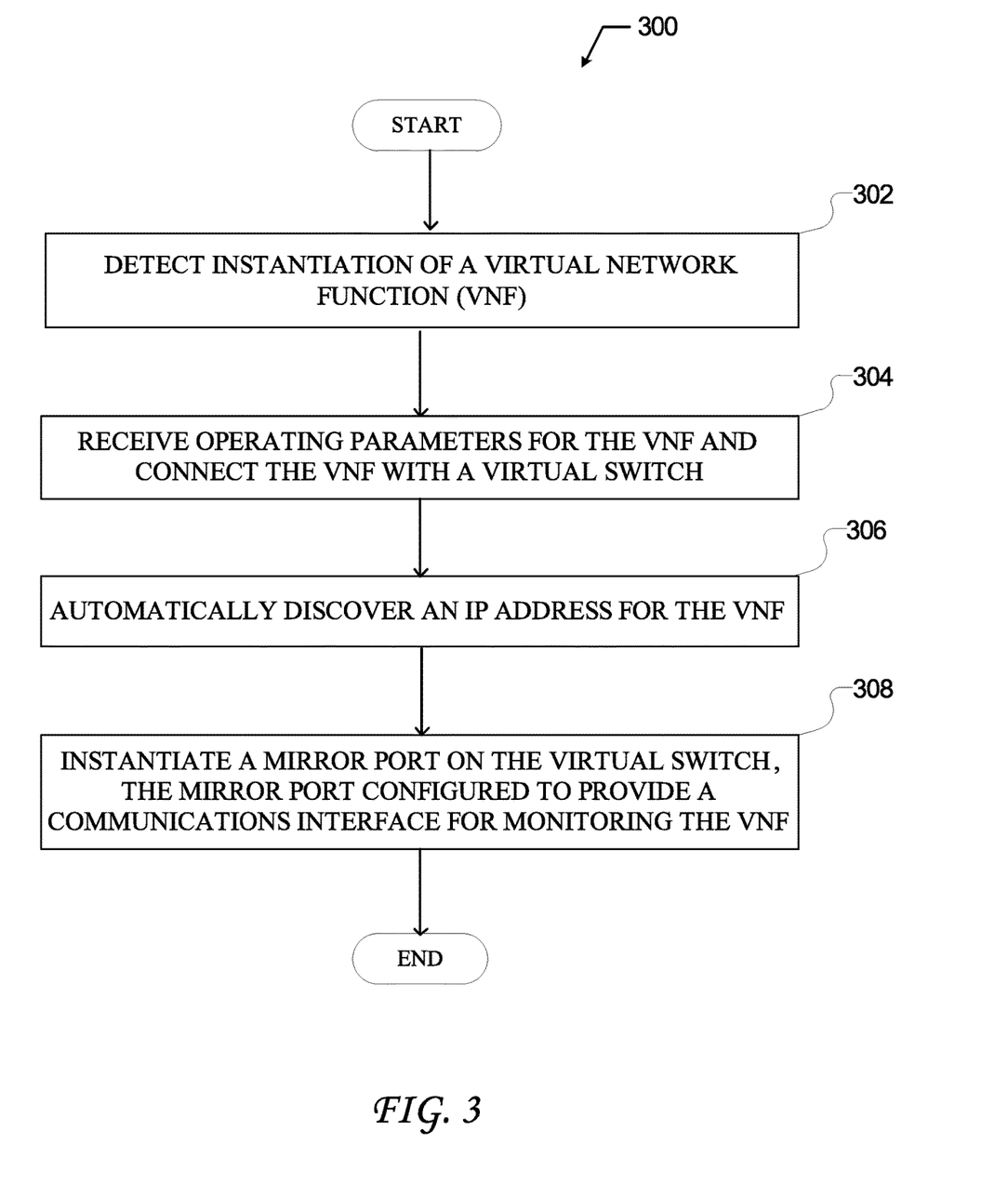
FIG. 3 illustrates steps of an example process for monitoring a virtual network function (VNF) using one or more mirror-ports, according to some aspects of the technology.

FIG. 3 illustrates steps of an example process 300 for monitoring a virtual network function (VNF) using mirror-ports. Process 300 begins with step 302, in which an instantiation of a virtual network function (VNF) is detected, for example, by the host NFV platform, such as NFV platform 202 running a hypervisor, as discussed above.

In step 304, operating parameters are received for the VNF. Operating parameters can be user provided, for example, by a network administrator that is directly logged into the NFV platform, or via an administration device, such as a network controller. Operating parameters can include VNF configuration details, such as indications of virtual resources to be allocated to VNF operation, e.g., virtual central processing units (CPUs), memory, and/or disk space allocations, etc.). Operating parameters can also include one or more monitoring parameters, i.e., that contain information regarding the types of monitoring and/or scripts that can be used to monitor the VNF. That is, monitoring parameters can be used to infer what types of network packets or other monitoring routines can be sourced from a mirror-port interface in order to verify a functional and/or operational status of a target VNF.

In step 306, an IP address of the VNF is automatically discovered. In some aspects, IP address discovery is performed through a lookup performed on the corresponding virtual switch. By performing automatic IP address discovery, IP address information does not have to be known and provided by the instantiating user.

In step 308, at least one mirror-port is instantiated on the virtual switch connected to the VNF. As discussed above, the mirror-port can be configured to be essentially identical to a communications port that provides an egress/ingress interface for data exchanged with the VNF.

Figure 4:
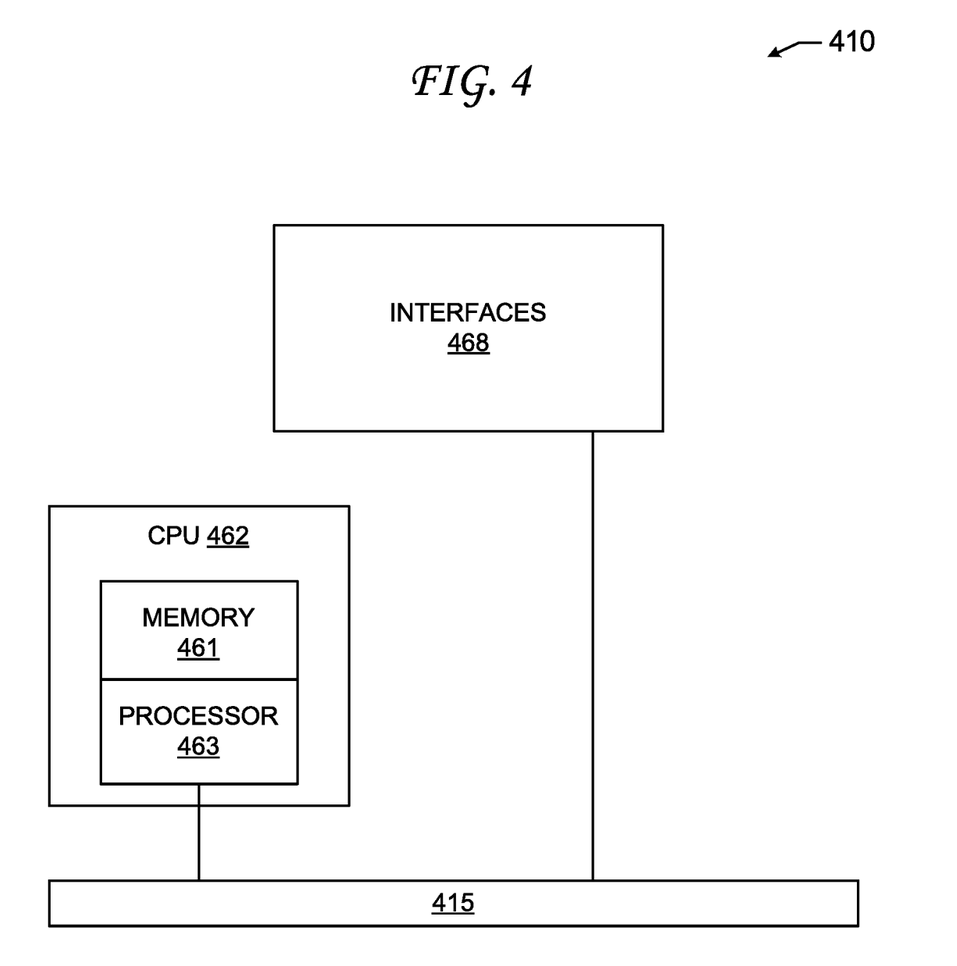
FIG. 4 illustrates an example network device on which some aspects of the technology can be implemented.

FIG. 4 illustrates an example network device 410 that can be used to implement network function virtualization platform, as discussed above. Network device 410 includes master central processing unit (CPU) 462, interfaces 468, and a bus 415 e.g., a Peripheral Computer Interconnect (PCI) bus. CPU 462 can be configured to perform monitoring for one or more virtual network functions under the control of software including an operating system and any appropriate applications software. CPU 462 can include one or more processors 463, such as processors from the Intel, ARM, and/or Motorola family of microprocessors or the MIPS family of microprocessors. In an alternative embodiment, processor 463 is specially designed hardware for controlling the operations of network device 410. In a specific embodiment, a memory 461 (such as non-volatile RAM and/or ROM) also forms part of CPU 462. However, there are many different ways in which memory could be coupled to the system.

Interfaces 468 can be provided as interface cards (sometimes referred to as "line cards"). Generally, they control the sending and receiving of data packets over the network and sometimes support other peripherals used with network device 410. Among the interfaces that may be provided are Ethernet interfaces, frame relay interfaces, cable interfaces, Digital Subscriber Line (DSL) interfaces, token ring interfaces, and the like. In addition, various very high-speed interfaces can be provided such as fast token ring interfaces, wireless interfaces, Ethernet interfaces, Gigabit Ethernet interfaces, Asynchronous Transfer Mode (ATM) interfaces, High Speed Serial Interfaces (HSSIs), POS interfaces, Fiber Distributed Data Interface (FDDIs), and the like. Generally, these interfaces can include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 461) configured to store program instructions for general-purpose network operations and mechanisms necessary to implement one or more of the network function virtualization monitoring operations discussed above.

For example, memory 461 can include a non-transitory computer-readable medium that includes instructions for causing CPU 462 to execute operations for detecting an instantiation of a first virtual network function (VNF), receiving a plurality of first operating parameters for the first VNF, the first operating parameters comprising a first monitoring parameter indicating a type of monitoring to be performed for the first VNF, connecting the first VNF with a first virtual switch, wherein the first VNF is configured to communicate with the first virtual switch via a first virtual port on the first virtual switch, and automatically discovering an Internet Protocol (IP) address of the first VNF. In some aspects, the operations can further include instantiating a first mirror-port on the first virtual switch, the first mirror-port configured to provide a communications interface for monitoring the first VNF based on the first monitoring parameter. Additionally, in some aspects, the automatic discover of the IP address of the first VNF can further include operations for automatically detecting a media access control (MAC) address assigned to the first VNF, and automatically performing an IP address lookup on the first virtual switch based on the MAC address assigned to the first VNF.

In some aspects, the first mirror-port is configured to monitor an alive-state of the first VNF using an Internet Control Message Protocol (ICMP) ping. In some aspects, the first VNF is a web server, and the first mirror-port is configured to monitor the first VNF using a World Wide Web and get command, i.e., a "wget" command. As understood by those of skill in the art GNU Wget (a.k.a. Wget or wget) is a computer program that retrieves content from servers, which supports downloading using different protocols, such as Hyper Text Transfer Protocol (HTTP), Hyper Text Transfer Protocol Secure (HTTPS), and File Transfer Protocol (FTP).

In some aspects, the first operating parameters can include a number of virtual central processing units (CPUs) provisioned for the first VNF and/or an amount of disk space provisioned for the first VNF.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for monitoring a virtual network function, the method comprising:
    detecting a first instantiation of a first virtual network function (VNF), the first VNF being a web server;
    inferring a first monitoring parameter from a name of the first VNF, the first monitoring parameter indicating a type of monitoring to be performed for the first VNF;
    receiving a plurality of first operating parameters for the first VNF, the plurality of first operating parameters including the first monitoring parameter, the plurality of first operating parameters including a number of virtual central processing units (CPUs) provisioned for the first VNF and/or an amount of disk space provisioned for the first VNF;
    connecting the first VNF with a first virtual switch, the first VNF configured to communicate with the first virtual switch via a first virtual port on the first virtual switch;
    automatically discovering an Internet Protocol (IP) address of the first VNF; and
    instantiating a first mirror-port on the first virtual switch, the first mirror-port configured to provide a communications interface for monitoring the first VNF based on the first monitoring parameter;
    wherein the first mirror-port is configured to monitor the first VNF using a wget command.

2. The computer-implemented method of claim 1, wherein the automatically discovering of the IP address of the first VNF comprises:
    automatically detecting a media access control (MAC) address assigned to the first VNF; and
    automatically performing an IP address lookup on the first virtual switch based on the MAC address assigned to the first VNF.

3. The computer-implemented method of claim 1, wherein the first mirror-port is configured to monitor an alive-state of the first VNF using an Internet Control Message Protocol (ICMP) ping.

4. The computer-implemented method of claim 1, wherein the plurality of first operating parameters includes the number of virtual central processing units (CPUs) provisioned for the first VNF.

5. The computer-implemented method of claim 1, wherein the plurality of first operating parameters includes an amount of disk space provisioned for the first VNF and the number of virtual central processing units (CPUs) provisioned for the first VNF.

6. A system for monitoring virtual network functions, the system comprising:
    one or more processors;
    a network interface coupled to one or more the processors, the network interface configured to send and receive data packets over a computer network; and
    a computer-readable memory coupled to the processors, the memory comprising instructions stored therein, which when executed by the one or more processors, cause the one or more processors to perform operations comprising:
        detecting a first instantiation of a first virtual network function (VNF)), the first VNF being a web server;
        inferring a first monitoring parameter from a name of the first VNF, the first monitoring parameter indicating a type of monitoring to be performed for the first VNF;
        receiving a plurality of first operating parameters for the first VNF, the plurality of first operating parameters including the first monitoring parameter, the plurality of first operating parameters including a number of virtual central processing units (CPUs) provisioned for the first VNF and/or an amount of disk space provisioned for the first VNF;
        connecting the first VNF with a first virtual switch, the first VNF is configured to communicate with the first virtual switch via a first virtual port on the first virtual switch;
        automatically discovering an Internet Protocol (IP) address of the first VNF; and instantiating a first mirror-port on the first virtual switch, the first mirror-port configured to provide a communications interface for monitoring the first VNF based on the first monitoring parameter;

wherein the first mirror-port is configured to monitor the first VNF using a wget command.

7. The system of claim 6, wherein the automatically discovering of the IP address of the first VNF comprises:
automatically detecting a media access control (MAC) address assigned to the first VNF; and
automatically performing an IP address lookup on the first virtual switch based on the MAC address assigned to the first VNF.

8. The system of claim 6, wherein the first mirror-port is configured to monitor an alive-state of the first VNF using an Internet Control Message Protocol (ICMP) ping.

9. The system of claim 6, wherein the plurality of first operating parameters includes the number of virtual central processing units (CPUs) provisioned for the first VNF.

10. The system of claim 6, wherein the plurality of first operating parameters includes the amount of disk space provisioned for the first VNF and the number of virtual central processing units (CPUs) provisioned for the first VNF.

11. A non-transitory computer-readable storage medium comprising instructions stored therein, which when executed by one or more processors, cause the one or more processors to perform operations comprising:
detecting an instantiation of a first virtual network function (VNF)), the first VNF being a web server;
inferring a first monitoring parameter from a name of the first VNF, the first monitoring parameter indicating a type of monitoring to be performed for the first VNF;
receiving a plurality of first operating parameters for the first VNF, the plurality of first operating parameters and including the first monitoring parameter, the plurality of first operating parameters including a number of virtual central processing units (CPUs) provisioned for the first VNF and/or an amount of disk space provisioned for the first VNF;
connecting the first VNF with a first virtual switch, the first VNF configured to communicate with the first virtual switch via a first virtual port on the first virtual switch;
automatically discovering an Internet Protocol (IP) address of the first VNF; and
instantiating a first mirror-port on the first virtual switch, the first mirror-port configured to provide a communications interface for monitoring the first VNF based on the first monitoring parameter;
wherein the first mirror-port is configured to monitor the first VNF using a wget command.

12. The non-transitory computer-readable storage medium of claim 11, wherein the automatically discovering of the IP address of the first VNF includes:
automatically detecting a media access control (MAC) address assigned to the first VNF; and
automatically performing an IP address lookup on the first virtual switch based on the MAC address assigned to the first VNF.

13. The non-transitory computer-readable storage medium of claim 11, wherein the first mirror-port is configured to monitor an alive-state of the first VNF using an Internet Control Message Protocol (ICMP) ping.

14. The non-transitory computer-readable storage medium of claim 11, wherein the plurality of first operating parameters includes the number of virtual central processing units (CPUs) provisioned for the first VNF.

15. The non-transitory computer-readable storage medium of claim 11, wherein the plurality of first operating parameters includes the amount of disk space provisioned for the first VNF and the number of virtual central processing units (CPUs) provisioned for the first VNF.

* * * * *